(12) United States Patent
James

(10) Patent No.: US 10,315,279 B2
(45) Date of Patent: Jun. 11, 2019

(54) HOT ISOSTATIC PRESSING SYSTEM FOR THE ASSEMBLY OF MODULAR COMPONENTS USABLE IN A TURBINE ENGINE

(71) Applicant: SIEMENS AKTIENGESELLSCHAFT, München (DE)

(72) Inventor: Allister William James, Chuluota, FL (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 162 days.

(21) Appl. No.: 15/326,818

(22) PCT Filed: Aug. 8, 2014

(86) PCT No.: PCT/US2014/050261
§ 371 (c)(1),
(2) Date: Jan. 17, 2017

(87) PCT Pub. No.: WO2016/022139
PCT Pub. Date: Feb. 11, 2016

(65) Prior Publication Data
US 2017/0203396 A1 Jul. 20, 2017

(51) Int. Cl.
*B21D 39/00* (2006.01)
*B21D 39/03* (2006.01)
(Continued)

(52) U.S. Cl.
CPC .............. *B23P 11/00* (2013.01); *B21D 39/00* (2013.01); *B21D 39/03* (2013.01); *B23K 20/021* (2013.01);
(Continued)

(58) Field of Classification Search
CPC ......... B23P 11/00; B21D 39/00; B21D 39/03; B23K 20/021; B23K 20/18; F05D 2230/42
(Continued)

(56) References Cited

U.S. PATENT DOCUMENTS

| 3,952,939 A | 4/1976 | Schilling et al. |
| 4,137,619 A | 2/1979 | Beltran et al. |

(Continued)

FOREIGN PATENT DOCUMENTS

| JP | S61-091073 A | 5/1986 |
| JP | 01141882 A | 6/1989 |

(Continued)

OTHER PUBLICATIONS

PCT International Search Report and Written Opinion dated May 8, 2015 corresponding to PCT Application No. PCT/US2014/050261 filed Aug. 8, 2014.

*Primary Examiner* — Christopher J Besler

(57) ABSTRACT

A method (300) of using hot isostatic pressing to join metallic members that form a component in a gas turbine engine is disclosed. The method (300) may include applying (306) a surface treatment to the outer surfaces (14, 15, 16, 20, 22, 24) of first and second metallic members (12, 18) based on whether a mechanical or metallurgical joint for the component is desired. Additionally, the method (300) may include aligning (310) the outer surfaces (14, 15, 16, 20, 22, 24) of the first and second metallic members (12, 18) to create a sealed cavity, which encompasses the joint, between the first and second metallic members (12, 18). Once the outer surfaces (14, 15, 16, 20, 22, 24) are aligned, the method (300) may include subjecting (314) the members (12, 18) to hot isostatic pressing such that material from the first metallic member (12) flows into a recess (26) within the second metallic member (18) so as to join the first and (Continued)

second metallic members (12, 18) to form a consolidated component (10). The consolidated component (10) may then be machined and finished (316) for use in a turbine engine.

7 Claims, 3 Drawing Sheets

(51) Int. Cl.
*B23K 20/02* (2006.01)
*B23K 20/18* (2006.01)
*B23P 11/00* (2006.01)
*B23K 20/24* (2006.01)
*F01D 25/28* (2006.01)
*B21D 53/78* (2006.01)
*B23K 101/00* (2006.01)

(52) U.S. Cl.
CPC .............. *B23K 20/18* (2013.01); *B23K 20/24* (2013.01); *F01D 25/28* (2013.01); *B21D 53/78* (2013.01); *B23K 2101/001* (2018.08); *F05D 2230/42* (2013.01)

(58) Field of Classification Search
USPC ..................................................... 72/54–63
See application file for complete search history.

(56) References Cited

U.S. PATENT DOCUMENTS

| | | |
|---|---|---|
| 4,152,816 A | 5/1979 | Ewing et al. |
| 4,370,789 A | 2/1983 | Schilke et al. |
| 4,492,737 A | 1/1985 | Conolly |
| 4,811,892 A | 3/1989 | Kunzmann et al. |
| 4,869,645 A | 9/1989 | Verpoort |
| 4,934,579 A | 6/1990 | Doble |
| 5,156,321 A | 10/1992 | Liburdi et al. |
| 5,273,708 A | 12/1993 | Freeman |
| 5,363,554 A | 11/1994 | Partridge et al. |
| 5,383,985 A | 1/1995 | Coulon |
| 5,395,699 A | 3/1995 | Ernst et al. |
| 6,218,026 B1 | 4/2001 | Ewing et al. |
| 6,638,639 B1 | 10/2003 | Burke et al. |
| 6,709,771 B2 | 3/2004 | Allister |
| 6,878,412 B2 | 4/2005 | Hebeisen et al. |
| 7,000,306 B2 | 2/2006 | Rice et al. |
| 7,137,787 B2 | 11/2006 | James |
| 7,316,066 B2 | 1/2008 | Twigg |
| 7,484,651 B2 | 2/2009 | Gandy et al. |
| 7,900,458 B2 | 3/2011 | James et al. |
| 7,905,016 B2 | 3/2011 | James et al. |
| 7,968,144 B2 | 6/2011 | James et al. |
| 8,206,117 B2 | 6/2012 | Strangman et al. |
| 8,215,900 B2 | 7/2012 | Morrison |
| 8,257,038 B2 | 9/2012 | James |
| 8,618,440 B2 | 12/2013 | Allen et al. |
| 2004/0035698 A1 | 2/2004 | Ivanov et al. |
| 2006/0239825 A1 | 10/2006 | Rice et al. |
| 2007/0102494 A1* | 5/2007 | Connelly .............. B21D 26/055 228/157 |
| 2011/0286855 A1 | 11/2011 | Cappuccini et al. |
| 2012/0135198 A1 | 5/2012 | Strother |

FOREIGN PATENT DOCUMENTS

| | | |
|---|---|---|
| JP | H05-318019 A | 12/1993 |
| WO | 2004075291 A1 | 2/2004 |

* cited by examiner

HOT ISOSTATIC PRESSING SYSTEM FOR THE ASSEMBLY OF MODULAR COMPONENTS USABLE IN A TURBINE ENGINE

FIELD OF THE INVENTION

The present application relates to turbine engines, modular componentry, and isostatic pressing processes, and more particularly, to utilizing hot isostatic pressing for the assembly of modular components usable in turbine engines.

BACKGROUND

Hot isostatic pressing is a well-known technique that is commonly used for the consolidation of powder particles in the field of powder metallurgy and for the densification of components after casting. Additionally, hot isostatic pressing has been used in the process of diffusion bonding. Notably, hot isostatic assembly processing provides for minimal additional manufacturing steps since the joining of the pieces of a component may occur concurrently with a hot isostatic densification process, which is typically used as a post-cast operation for structural cast parts. Thus, a need exists for a more robust method for assembling modular componentry that takes advantage of the properties of hot isostatic pressing.

SUMMARY OF THE INVENTION

A method of using hot isostatic pressing to join metallic members that form a component, such as for use in a gas turbine engine, is disclosed. The method may include applying a surface treatment to the outer surfaces of a first metallic member and a second metallic member. The type of surface treatment utilized may depend on whether a mechanical or metallurgical joint is desired for the component. Additionally, the method may include aligning the outer surfaces of the first and second metallic members to create a sealed cavity, which encompasses the desired joint, between the first and second metallic members. Once the outer surfaces of the first and second metallic members are aligned, the method may include subjecting the first and second metallic members to heat and pressure conditions, such as via hot isostatic pressing, such that material from the first metallic member flows into a recess within the second metallic member so as to join the first and second metallic members to form the desired consolidated component. The consolidated component may then be machined and finished for use in the turbine engine.

In at least one embodiment, a method of joining metallic members forming a component in a gas turbine may include applying a first surface treatment to an outer surface of a first metallic member and a second surface treatment to an outer surface of a second metallic member. If a mechanical joint is desired for the component, the surface treatments may be utilized to inhibit bonding or metallurgical joining of the outer surfaces of the first and second metallic members. In certain embodiments, the surface treatments may include applying a surface oxide film or other similar film to the outer surfaces of the first and second metallic members to inhibit the bonding or metallurgical joining of the outer surfaces. However, if a metallurgical joint is desired for the component, the method may include cleaning the outer surfaces of the first and second metallic members to remove any contaminants that may inhibit bonding. Then, the surface treatments for enhancing and promoting bonding may be applied to the outer surfaces of the first and second metallic members.

The method may then include positioning the first and second metallic members together so that the outer surface of the first metallic member is aligned with the outer surface of the second metallic member. When the outer surfaces of the first and second metallic members are aligned, the second metallic member may include a recess in the outer surface of the second metallic member that is not filled with a portion of the first metallic member when the outer surfaces of the first and second metallic members are aligned. The method may then include sealing the first and second metallic members together such that the outer surfaces of the first and second metallic members that are aligned together are contained within a sealed environment. In certain embodiments, the sealing may be performed by applying a local metallic coating to the first and second metallic members. Once the first and second metallic members are sealed, the method may include applying hot isostatic pressing conditions to the first and second metallic members such that a portion of the first metallic member changes shape to fill the recess in the second metallic member. When filled, the recess may serve as a locking feature that locks the first and second metallic members together to form the desired component.

These and other features of the method of using hot isostatic pressing to join metallic members that form a component in a gas turbine engine are described in the following detailed description, drawings, and appended claims.

DETAILED DESCRIPTION OF THE INVENTION

Figure 1:
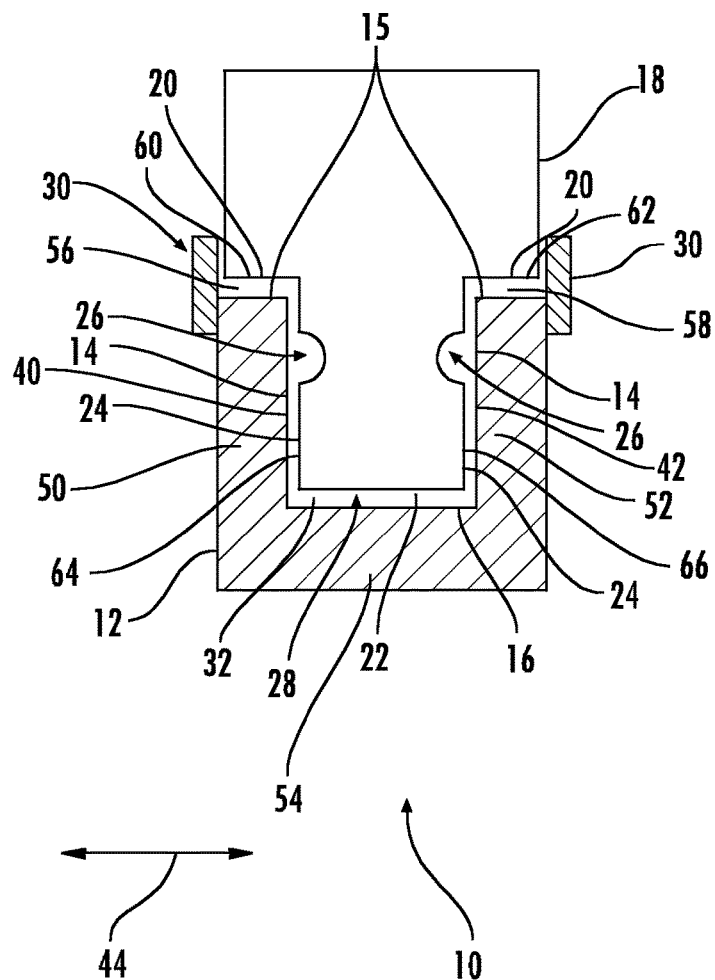
FIG. 1 is a top view schematic diagram of a pair of metallic members being aligned before being subjected to hot isostatic pressing according to an embodiment of the present disclosure.
Figure 2:
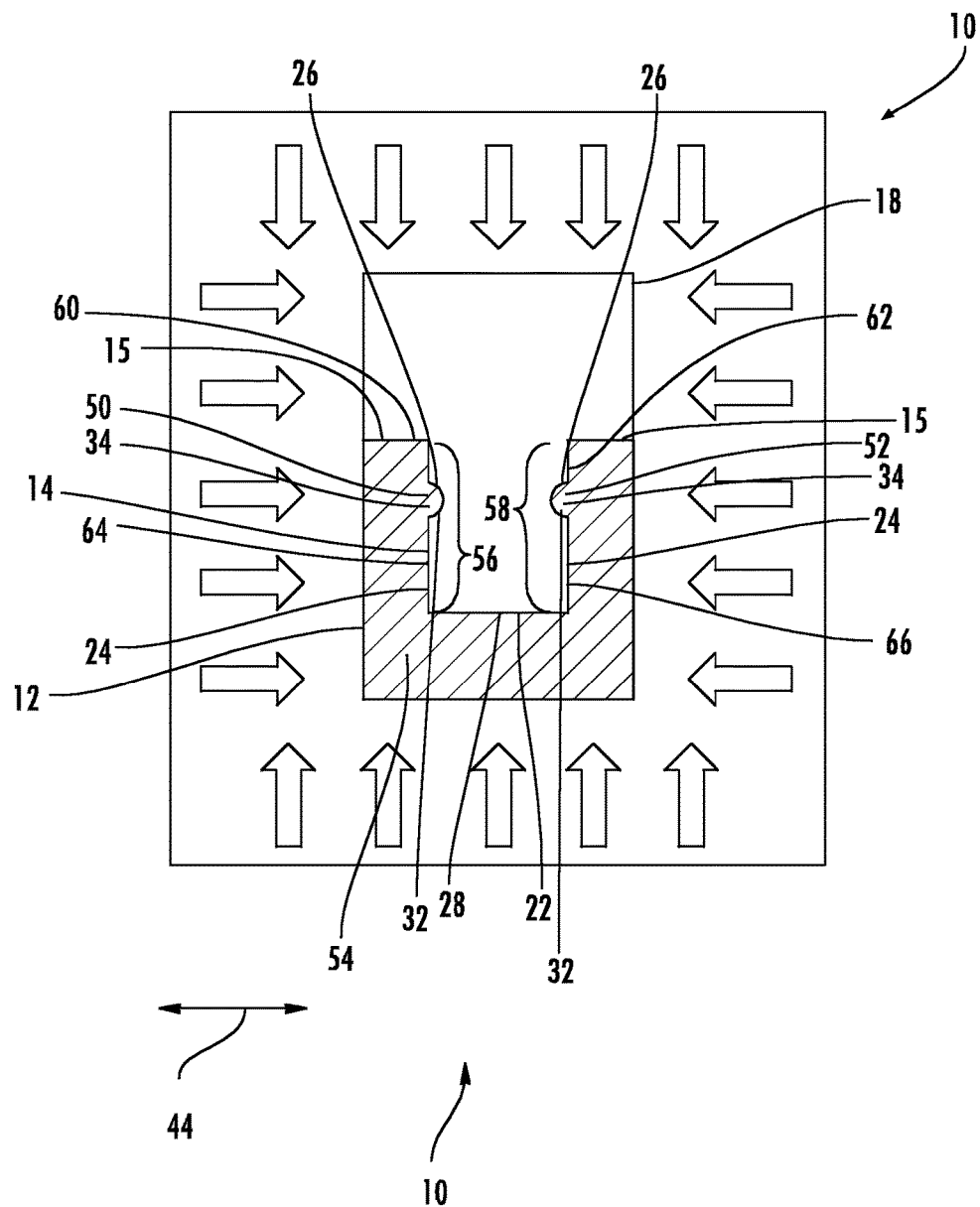
FIG. 2 is a top view schematic diagram of the pair of metallic members of FIG. 1 after the metallic members have been subjected to hot isostatic pressing.
Figure 3:
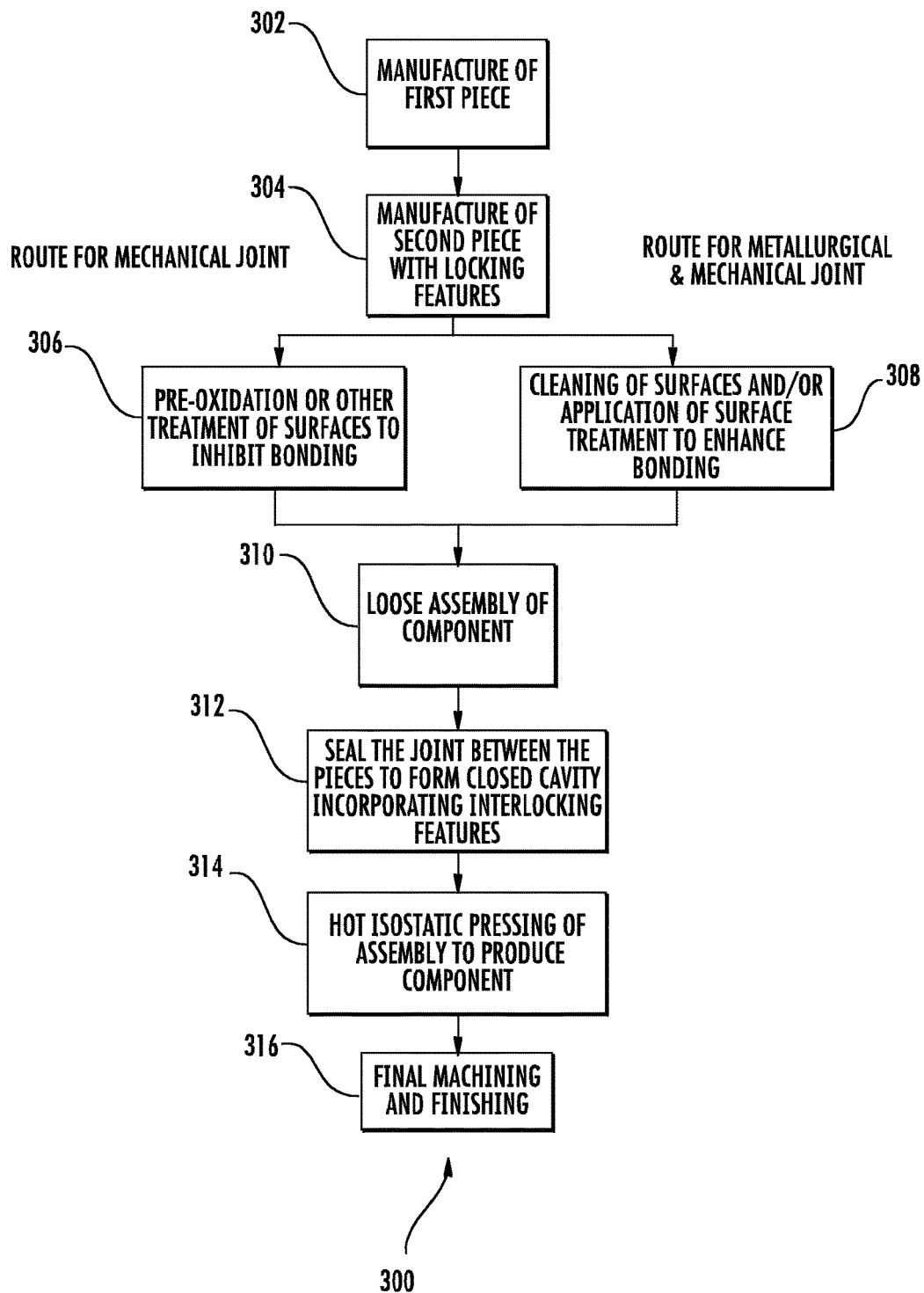
FIG. 3 is a flow diagram of a method of joining metallic members forming a component in a gas turbine engine according to an embodiment of the present disclosure.

As shown in FIGS. 1-3, a component 10 assembled using a method involving hot isostatic pressing, such as for use in a gas turbine engine, is disclosed. The method may include applying a surface treatment to the outer surfaces of a first metallic member 12 and a second metallic member 18. The type of surface treatment utilized may depend on whether a mechanical or metallurgical joint is desired for the component 10. Additionally, the method may include aligning the outer surfaces 14, 15, 16, 20, 22, 24 of the first and second metallic members 12, 18 to create a sealed cavity 32, which encompasses the desired joint, between the first and second metallic members 12, 18. Once the outer surfaces 14, 15, 16, 20, 22, 24 of the first and second metallic members 12, 18 are aligned, the method may include subjecting the first and second metallic members 12, 18 to heat and pressure conditions, such as via hot isostatic pressing, such that portions 34 from the first metallic member 12 flow into the sealed recess 26 so as to join the first and second metallic members 12, 18 to form the desired consolidated component 10. The consolidated component 10 may then be machined and finished for use in the turbine engine.

As shown in FIGS. 1-2, the first metallic member 12 may be configured to be generally U-shaped, however, in other embodiments, the first metallic member 12 may have any other desired shape that may be utilized in forming a joint for the component 10. The shape of the first metallic member 12 may be such that once positioned in close proximity to the second metallic member 18 and subjected to isostatic pressing, the first metallic member 12 is attached to the second metallic member 18 and cannot be separated. The first metallic member 12 may be formed from first and second arms 50, 52 coupled together via an extension body 54. In at least one embodiment, the first and second arms 50, 52 may be generally orthogonal to the extension body 54. In another embodiment, one of the first or second arms 50, 52, or both, may be nonorthogonal and nonparallel with the extension body 54. The first and second arms 50, 52 may have equal lengths or may have unequal lengths.

In at least one embodiment, the first metallic member 12 may include one or more first inner surfaces 14, one or more end surfaces 15, and one or more inner connection surface 16 coupling first and second inner surfaces 40, 42 together. The first and second inner surfaces 40, 42 may either be orthogonal to each other or form an acute angle with each other so that once, the first and second metallic members 12, 18 are coupled together, the first and second inner surfaces 40, 42 prevent lateral movement in the direction of arrow 44.

In at least one embodiment, the first metallic member 12 may include a pair of first inner surfaces 14, a pair of end surfaces 15, and an inner connection surface 16. In certain embodiments, the end surfaces 15 and the inner connection surface 16 may be orthogonal to the first inner surfaces 14. The second metallic member 18 may be configured to be generally T-shaped, however, in other embodiments, the second metallic member 18 may have any other desired shape that may be utilized in forming the joint for the component 10. As shown in FIGS. 1 and 3, the second metallic member 18 may include first and second recesses 56, 58 configured to receive the first and second arms 50, 52. The first and second recesses 56, 58 may be formed from first sides 60, 62 and second sides 64, 66. In at least one embodiment, the second sides 64, 66 may be aligned with each other. The first side 60 of the first arm 50 may be generally orthogonal to the second side 64. The first side 62 of the second arm 52 may be generally orthogonal to the second side 66. In other embodiments, the first sides 60, 62 may be positioned in other relationships relative to the second sides 64, 66. The second sides 64, 66 should be configured to be aligned and in close proximity with surfaces of the first metallic member 12. Additionally, the second metallic member 18 may be shaped such that, when aligned with the first metallic member 12, a reasonably snug fit between the first and second metallic members 12, 18 may occur. In at least one embodiment, the second metallic member 18 may include one or more end surfaces 20, an inner connection surface 22, and a one or more first inner surfaces 24. In at least one embodiment, the second metallic member 18 may have a pair of end surfaces 20, an inner connection surface 22, and a pair of first inner surfaces 24. In certain embodiments, that upper horizontal outer surfaces 20 and the inner connection surface 22 may be orthogonal to the first inner surfaces 24. The second metallic member 18 may also include a pair of recesses 26, which may be utilized as locking features in the joint region of the component 10. The recesses 26 are shown in FIG. 1 as having a semicircle shape, however, any other desired shape may be utilized as well.

Depending on whether a mechanical or metallurgical joint is desired for the component 10, various surface treatments may be applied to the outer surfaces 14, 15, 16, 20, 22, 24 of the first and second metallic members 12, 18. If a mechanical joint is desired, the outer surfaces 14, 15, 16, 20, 22, 24 may be treated with a surface inhibitor treatment, such as, but not limited to, a surface oxide film 28 or other treatment such as, but not limited to, heating the parts in an oxidizing environment (e.g. air) to form an oxide film so as to inhibit metallurgical joining of the outer surfaces 14, 15, 16 of the first metallic member 12 with the outer surfaces 20, 22, 24 of the second metallic member 18. However, if a metallurgical joint is desired, the outer surfaces 14, 15, 16, 20, 22, 24 may be cleaned to remove contaminants and treated with one or more surface enhancement treatments that enhance or otherwise promote bonding between the outer surfaces 14, 15, 16 of the first metallic member 12 and the outer surfaces 20, 22, 24 of the second metallic member 18. Surface treatments for promoting bonding may include, but are not limited to, a flux such as borax which is commonly used in brazing operations and acts as a reducing agent. In certain embodiments, in order to align the first and second metallic members 12, 18, the outer surfaces 14, 15, 16 of the first metallic member 12 and the outer surfaces 20, 22, 24 of the second metallic member 18 may be welded together. In other embodiments, the first and second metallic members may be treated with a local metallic coating 30, such as, but not limited to, NiCoCrAlY or CoNiCrAlY that may allow any surface gaps between the outer surfaces 14, 15, 16 of the first metallic member 12 and the outer surfaces 20, 22, 24 of the second metallic member 18 to be closed.

Although FIGS. 1-2 illustrates specific example configurations of the first and second metallic members 12, 18 used in making the component 10, the component 10 may include any configuration, which may include using a greater or lesser number of the components for making the component 10. For example, the component 10 is illustratively shown as including a first metallic member 12, a second metallic member 18, a pair of recesses 26, and outer surfaces 14, 15, 16, 20, 22, 24. However, the component 10 may include a greater or lesser number of first metallic members 12, second metallic members 18, recesses 26, outer surfaces 14, 15, 16, 20, 22, 24, or any number of any of the other components in the system 200.

As shown in FIG. 3, a method 300 of joining the first and second metallic members 12, 18 forming the component 10 in a gas turbine engine is provided. The method 300 may include, at step 302, manufacturing the first metallic member 12. At step 304, the method may include manufacturing the second metallic member 18. The second metallic member 18 may include one or more recesses 26, which may serve as locking features for locking the first and second metallic members 12, 18 together. If a mechanical joint is desired for the component 10, the method 300 may include, at step 306, applying a surface inhibitor treatment to the outer surfaces 14, 15, 16 of the first metallic member 12 and the outer surfaces 20, 22, 24 of the second metallic member 18. The surface treatment may include application of a surface oxide film or other treatment to inhibit bonding between the outer surfaces 14, 15, 16 of the first metallic member 12 and the outer surfaces 20, 22, 24 of the second metallic member 18. However, if a metallurgical joint is desired, the method 300 may include cleaning the outer surfaces 14, 15, 16, 20, 22, 24 to remove contaminants and applying a surface enhancement treatment that promotes bonding between the outer surfaces 14, 15, 16 of the first metallic member 12 and the outer surfaces 20, 22, 24 of the second metallic member 18.

At step 310, the method 300 may include loosely aligning the outer surfaces 14, 15, 16 of the first metallic member 12 and the outer surfaces 20, 22, 24 of the second metallic member 18 together so as to form the joint between the first and second metallic members 12, 18. Then, at step 312, the method 300 may include sealing the first and second metallic members 12, 18 together such that the outer surfaces 14, 15, 16, 20, 22, 24 of the first and second metallic members 12, 18 that are aligned together are contained within a sealed environment or cavity 32. The outer surfaces 14, 15, 16, 20, 22, 24 of the first and second metallic members 12, 18 may be sealed together by applying a local metallic coating 30 as described above that may allow any surface gaps between the outer surfaces 14, 15, 16 of the first metallic member 12 and the outer surfaces 20, 22, 24 of the second metallic member 18 to be closed.

The method 300 may include, at step 314, subjecting the first and second metallic members 12, 18 to a hot isostatic pressing process or other similar process to join the first and second metallic members 12, 18 together. Pressures and heat having temperatures that are sufficient to cause portions 34 of the first metallic member 12 to melt and flow into the cavity 32 and recesses 26 of the second metallic member 18 may be applied during the hot isostatic pressing processing. The step 314 of applying heat to the first and second metallic members 12, 18 such that the portion of the first metallic member 12 changes shape to fill the recess 26 in the second metallic member 18 includes applying heat having a temperature that is below a melting point for the portion of the first metallic member 12. Once the portions 34 flow into the recesses 26 defined by the interlocking feature of the component 10, this may result in the joining of the first and second metallic members 12, 18 to form the consolidated component 10. At step 316, the component 10 may be machined and finished utilizing various machining and finishing operations such as any convention (e.g. milling or grinding) or non-conventional (e.g. electrical discharge machining (EDM), electrochemical machining (ECM), abrasive water jet) machining operation may be employed. It is important to note that the component 10 and method 300 are not intended to be limited to the description or examples provided herein.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A method of joining metallic members forming a component in a gas turbine engine, comprising:

applying a first surface inhibitor treatment to an outer surface of a first metallic member, thereby inhibiting bonding to the outer surface of the first metallic member;

applying a second surface inhibitor treatment to an outer surface of a second metallic member, thereby inhibiting bonding to the outer surface of the second metallic member;

positioning the first and second metallic members together such that the outer surface of the first metallic member is aligned with the outer surface of the second metallic member, wherein the second metallic member includes a recess in the outer surface of the second metallic member that is not filled with a portion of the first metallic member when the outer surfaces of the first and second metallic members are aligned;

sealing the first and second metallic members together such that the outer surfaces of the first and second metallic members that are aligned together are contained within a sealed environment; and applying pressure to the first and second metallic members such that a portion of the first metallic member changes shape to fill the recess in the second metallic member, whereby the recess is a locking feature that, when filled, locks the first metallic member to the second metallic member.

2. The method of claim 1, wherein the step of sealing the first and second metallic members together further comprising applying a metallic coating to the outer surfaces of the first and second metallic members.

3. The method of claim 1, comprising applying heat to the first and second metallic members such that the portion of the first metallic member changes shape to fill the recess in the second metallic member, wherein the heat has a temperature that is below a melting point for the portion of the first metallic member.

4. The method of claim 1, wherein a mechanical joint is created when the first metallic member is locked to the second metallic member.

5. The method of claim 1, wherein the first surface inhibitor treatment to the outer surface of the first metallic member comprises an application of a surface oxide film to the outer surface of the first metallic member to inhibit bonding to the outer surface of the first metallic member.

6. The method of claim 1, wherein the second surface inhibitor treatment to the outer surface of the second metallic member comprises an application of a surface oxide film to the outer surface of the second metallic member to inhibit bonding to the outer surface of the first metallic member.

7. The method of claim 1, comprising machining the first and second metallic members after the first and second metallic members are locked.

* * * * *